United States Patent
Senevirathne et al.

(10) Patent No.: US 10,884,809 B2
(45) Date of Patent: Jan. 5, 2021

(54) CROSS-CLOUD WORKFLOW MANAGEMENT

(71) Applicant: VMWARE, INC., Palo Alto, CA (US)

(72) Inventors: Tissa Senevirathne, Palo Alto, CA (US); Andrew Sharpe, Palo Alto, CA (US); Harish Barkur Bhat, Bangalore (IN); Francis Guillier, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 50 days.

(21) Appl. No.: 16/411,171

(22) Filed: May 14, 2019

(65) Prior Publication Data
US 2020/0241928 A1 Jul. 30, 2020

(30) Foreign Application Priority Data
Jan. 25, 2019 (IN) .............................. 201941003273

(51) Int. Cl.
*G06F 9/46* (2006.01)
*G06F 9/50* (2006.01)
*G06F 16/901* (2019.01)
*G06F 17/16* (2006.01)

(52) U.S. Cl.
CPC .......... *G06F 9/5044* (2013.01); *G06F 9/5077* (2013.01); *G06F 16/9024* (2019.01); *G06F 17/16* (2013.01)

(58) Field of Classification Search
CPC .. G06F 9/5044; G06F 16/9024; G06F 9/5077; G06F 17/16
See application file for complete search history.

(56) References Cited

U.S. PATENT DOCUMENTS

| | | | | |
|---|---|---|---|---|
| 9,407,944 B1* | 8/2016 | Galdy | ................ | H04N 21/2385 |
| 2011/0191779 A1* | 8/2011 | Ujibashi | ................... | G06F 9/46 718/102 |
| 2016/0358102 A1* | 12/2016 | Bowers | ................... | G06N 20/00 |
| 2020/0057675 A1* | 2/2020 | Dias | ...................... | G06N 3/126 |

OTHER PUBLICATIONS

Naghibzadeh, Modeling workflow of tasks and task interaction graphs to schedule on the cloud, IARIA, 2016, pp. 69-75.*

* cited by examiner

*Primary Examiner* — Diem K Cao
(74) *Attorney, Agent, or Firm* — Patterson + Sheridan, LLP (57) ABSTRACT

A method of workflow management in a cloud computing system that includes generating a workflow graph from a workflow definition, the workflow graph including nodes representing work-elements; generating a stream matrix from the workflow graph, the stream matrix including pointers to lists of the work-elements, each of the lists representing a workstream; processing the stream matrix to place work-elements in a platform service pipeline for the cloud computing system based on resource availability of the platform service pipeline; and removing work-elements from the lists and the platform service pipeline upon completion.

20 Claims, 7 Drawing Sheets

CROSS-CLOUD WORKFLOW MANAGEMENT

RELATED APPLICATIONS

Benefit is claimed under 35 U.S.C. 119(a)-(d) to Foreign Application Serial No. 201941003273 filed in India entitled "CROSS-CLOUD WORKFLOW MANAGEMENT", on Jan. 25, 2019, by VMWARE, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

In a cloud environment, performance-centric workflows depend on the availability of a certain amount of dedicated resources. Management of such workflows differs significantly from typical "best effort" workflows. Management of performance centric workflows that span multiple clouds and cloud technologies (e.g. VMs, containers etc.) are especially challenging. Currently, there is no well-known definition for the anatomy of workflows as applicable to virtual workloads.

SUMMARY

One or more embodiments provide a method of workflow management in a cloud computing system that includes: generating a workflow graph from a workflow definition, the workflow graph including nodes representing work-elements; generating a stream matrix from the workflow graph, the stream matrix including pointers to lists of the work-elements, each of the lists representing a worktream; processing the stream matrix to place work-elements in a platform service pipeline for the cloud computing system based on resource availability of the platform service pipeline; and removing work-elements from the lists and the platform service pipeline upon completion.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for cross-cloud workflow management are described. Workflow management includes three components: a workflow, a workstream, and a work-element. A work-element is the lowest element and contains a series of tasks that are tightly coupled and need to be serviced together. Tasks contained within a work-element require a single platform type to execute. As an example, a task that requires one cloud platform cannot be grouped together with a task requiring another cloud platform. Such tasks are grouped in to separate work-elements. A workstream is the next level above the work-element. A workstream contains a series of ordered work-elements. Ordered work-elements means a given work-element must complete its execution before the scheduler proceeds to the next set of work-elements. A given workstream can be executed independently of other workstreams. A workstream can contain zero, one or more work-elements. At the highest level is the workflow. A workflow may include one or more work-streams.

In some embodiments, a workstream includes only work-elements. However, in other embodiments, a workstream can include other workflows. The workflows that exist within a larger workflow are referred to herein as "micro workflows" or simply "micro flows". Thus, workflows can be hierarchical in nature.

Techniques to automatically extract parallel workstreams from a workflow are described below. Also presented below are the workflow scheduling algorithm and blueprint architecture for virtual infrastructure. A combination of these building blocks allows for automatic management of workloads across multiple cloud platforms. Also the techniques presented herein allow workloads to mix and match different virtualization technologies, such as VMs and containers, across different cloud platforms. These and other aspects are described below with respect to the drawings.

Figure 1:
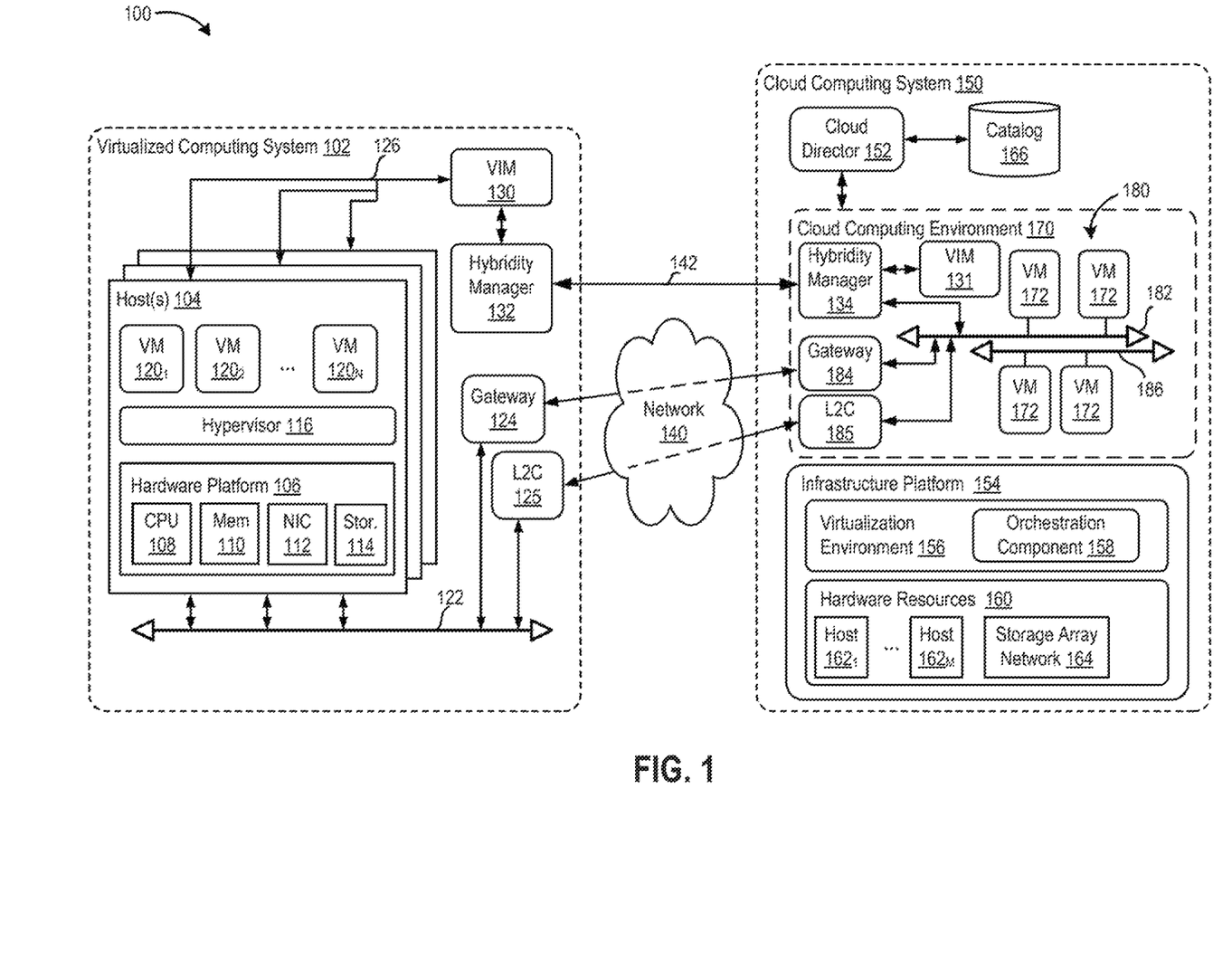
FIG. 1 is a block diagram of a hybrid cloud computing system, according to one embodiment disclosed herein.

FIG. 1 is a block diagram illustrating a hybrid cloud computing system 100 in which one or more embodiments of the present disclosure may be utilized. Hybrid cloud computing system 100 includes a virtualized computing system 102 and a cloud computing system 150. Hybrid cloud computing system 100 is configured to provide a common platform for managing and executing virtual workloads seamlessly between virtualized computing system 102 and cloud computing system 150. Although virtualized computing system 102 and cloud computing system 150 are shown for illustratively purposes, a hybrid cloud computing system may generally include any number of data centers.

In one embodiment, virtualized computing system 102 may be a data center controlled and administrated by a particular enterprise or business organization, while cloud computing system 150 may be operated by a cloud computing service provider and exposed as a service available to account holders, such as the particular enterprise in addition to other enterprises. In such a case, virtualized computing system 102 may be referred to as an on-premise data center(s), and cloud computing system 150 may be referred to as a "public" cloud service. In some embodiments, virtualized computing system 102 may be configured as a private cloud service providing cloud services to various organizations within the enterprise. In other embodiments, virtualized computing system 102 and cloud computing system 150 may both be public clouds.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In a hybrid cloud, a tenant may be provided with seamless access to one or more private cloud resources and/or public cloud resources.

Virtualized computing system 102 includes one or more host computer systems 104. Each of hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processors 108 are configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as networks 122 and 126 within virtualized computing system 102. Network interface 112 may include one or more network adapters, also referred to as network interface cards (NICs). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere® solution made commercially available from VMware, Inc. Hypervisor 116 may run on top of the operating system of host 104 or directly on hardware components of host 104. In addition, hypervisor 116 may provide a virtual switch (not shown), which is a software-based switch acting as a layer 2 (L2) forwarding engine and capable of performing VLAN tagging, stripping, filtering, L2 security, checksum, segmentation offload units, and other tasks typically performed by physical switches. The virtual switch may include uplink ports which connect to physical network adapters, as well as VM ports which connect to virtual network adapters and provide connections for hypervisor 116 and VMs. In one embodiment, the virtual switch may be part of a distributed virtual switch that is an abstraction of a switch across multiple host servers and that permits virtual switches on the multiple host servers to be managed as if ports of those virtual switches belonged to a single switch, the distributed virtual switch.

Virtualized computing system 102 includes a virtualization management module (depicted in FIG. 1 as virtualized infrastructure manager (VIM) 130) that may communicate with the plurality of hosts 104 via network 126, sometimes referred to as a management network. In one embodiment, VIM 130 is a computer program that resides and executes in a central server, which may reside in virtualized computing system 102, or alternatively, VIM 130 may run as a VM in one of hosts 104. One example of a VIM is the vCenter Server® product made available from VMware, Inc. VIM 130 is configured to carry out administrative tasks for virtualized computing system 102, including managing hosts 104, managing VMs 120 running within each host 104, provisioning VMs, migrating VMs from one host to another host, and load balancing between hosts 104.

As shown, virtualized computing system 102 further includes a hybridity manager 132 that is in communication with VIM 130 and configured to manage and integrate virtualized computing resources provided by cloud computing system 150 with virtualized computing resources of computing system 102 to form a unified "hybrid" computing platform. In one embodiment, hybridity manager 132 is configured to deploy VMs in cloud computing system 150, transfer VMs from virtualized computing system 102 to cloud computing system 150, and perform other "cross-cloud" administrative tasks, as described in greater detail later. Although shown as a separate computer program, which may execute in a central server or run in a VM in one of hosts 104, hybridity manager 132 may alternatively be a module or plug-in complement to VIM 130.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as a multi-tenant cloud service with logically isolated virtualized computing resources on a shared physical infrastructure. It is recognized that cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual machine) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is a WAN facing device providing services such as intelligent routing, traffic steering, WAN optimization, encryption, etc. Gateway 184 may be configured to provide virtual private network (VPN) connectivity over a network 140 with another VPN endpoint, such as a gateway 124 within virtualized computing system 102. In other embodiments, gateway 184 may be configured to connect to and communicate with virtualized computing system 102 using a high-throughput, dedicated link between virtualized computing system 102 and cloud computing system 150. Layer 2 concentrators (L2C) 125 and 185 are parallel to gateways 124 and 184 and configured to provide a "stretched" L2 network that spans virtualized computing system 102 and cloud computing system 150. The stretched network may be separate from the network used by gateways 124 and 184 so that, e.g., VM migration traffic over network used by gateways 124 and 183 does not create latency in stretched network.

As shown, cloud computing system 150 includes a hybridity manager 134 configured to communicate with the corresponding hybridity manager 132 in virtualized computing system 102 to enable a common virtualized computing platform between virtualized computing system 102 and cloud computing system 150. Hybridity manager 134 (e.g., executing as a virtual machine) may communicate with hybridity manager 132 using Internet-based traffic via a VPN tunnel established between gateways 124 and 184, or alternatively, using direct connect 142. In addition, hybridity manager 134 is in communication with a VIM 131, which may perform similar functionalities as VIM 130, described above.

Figure 2:
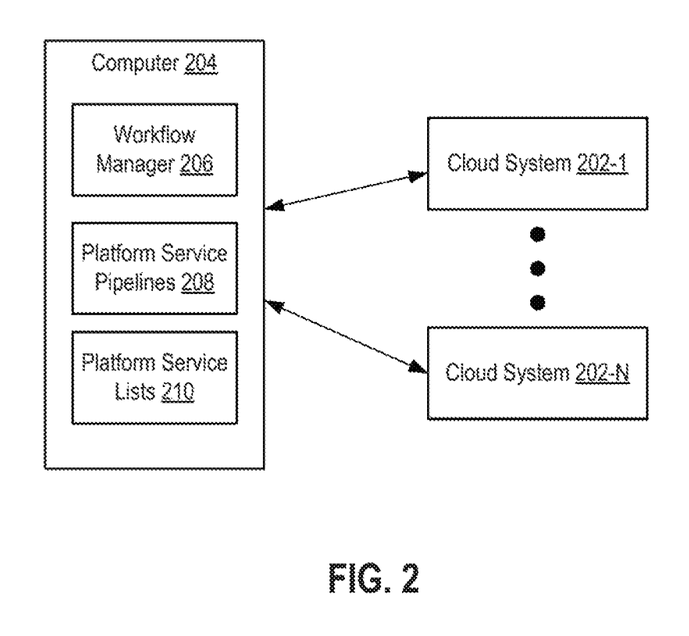
FIG. 2 is a block diagram depicting a computing system according to an embodiment.

FIG. 2 is a block diagram depicting a computing system 200 according to an embodiment. Computing system 200 includes a plurality of cloud systems 202 and a computer 204. Each cloud system 202 can be a public cloud, a private cloud, or a hybrid cloud system, such as hybrid cloud computing system 100 shown in FIG. 1 or similar thereto. Computer 204 can be a physical machine or virtual machine, and is configured to communication with cloud systems 202. Computer 204 includes a workflow manager 206. Workflow manager 206 comprises software executed by computer 204. Workflow manager 206 operates as described below to execute workflows across cloud systems 202. Workflow manager 206 also accesses platform service lists 210. Platform service lists 210 track available resources in cloud systems 202. Workflow manager 206 also manages platform service pipelines 208. Each platform service pipeline 208 includes a pipeline of work-elements to be executed for a given cloud system 202.

Workstream Data Structures

In embodiments, workflow manager 206 represents workstreams using the data structures explained here. Each workstream is represented by a list. Work-elements are added to the list in order. The head of the list contains the first element of the workstream, the second is the second element and so on. A given workflow may contain one or more workstreams. Therefore, there can be one or more lists, where each list represents a separate workstream. A stream matrix is a column matrix of (1×n), where n is the number of workstreams. A stream matrix includes a list of pointers. Each pointer points to a list representing a different workstream. Each row (workstream) is independent to each other and can be executed in parallel (subjected to, resource availability and other scheduling constraints). Together, these workstreams form a workflow. In embodiments, there is a separate set of stream matrices for each workflow. These workflows compete for platforms and resources.

Within a micro flow there can be other micro flows. These leads to a tree like structure or hierarchical relationship structure. Theoretically, the height of the tree can be very large. Automation of such complex workflows is nontrivial.

When constructing stream matrices, for algorithmic simplicity, without loss of generality, it can be assumed micro flow elements and work-elements are identical. However, workflow manager 206 performs appropriate operations based on the element type. In summary, workflow manager 206 spawns a new job when encountering a reference to a micro flow element within a given stream matrix. The new job has a reference to the parent job. When the micro flow completes, it marks the parent micro flow element as complete and the algorithm continues to the next work-element in the stream matrix of the parent. By design, a micro flow element in the parent stream matrix has a reference to the child stream matrix and hence it is capable of traversing through the tree. This is especially useful, if premature termination of the entire workflow is needed or to collect statistics on the entire workflow.

Figure 3:
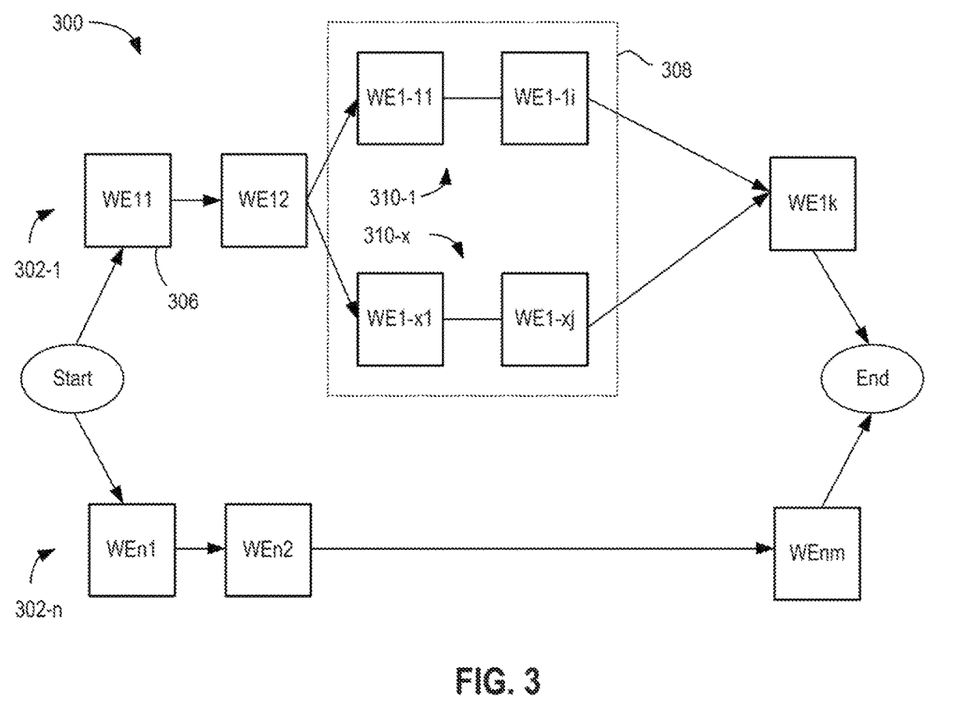
FIG. 3 is a block diagram depicting a workflow according to an embodiment.

FIG. 3 is a block diagram depicting a workflow 300 according to an embodiment. Workflow 300 includes workstreams 302-1 through 302-n (e.g., only workstreams 302-1 and 302-n are shown in detail and n is a positive integer). Each workstream 302 includes a plurality of work-elements 306. In the example, workstream 302-1 includes work-elements WE11, WE12, micro flow 308, WE11, and so on until WE1k (e.g., k work-elements and one micro flow 308, where k is a positive integer). Workstream 302-n includes work-elements WEn1, WEn2 and so on until WEnm (e.g., m work-elements, where m is a positive integer). Micro flow 308 is itself a workflow having workstreams 310-1 through 310-x (e.g., only workstreams 310-1 and 310-x are shown in detail and x is a positive integer). Workstream 310-1 includes work-elements WE1-11 through WE1-1i, where i is a positive integer. Workstream 310-x includes work-elements WE1-x1 through WE1-xj, where j is a positive integer. Workflow 300 is just an example. A workflow can include any number of workstreams. A workstream can include any number of work-elements and optional any number of micro flows. A micro flow can include any number of workstreams, each of which include any number of work elements and optional any number of micro flows.

Figure 4:
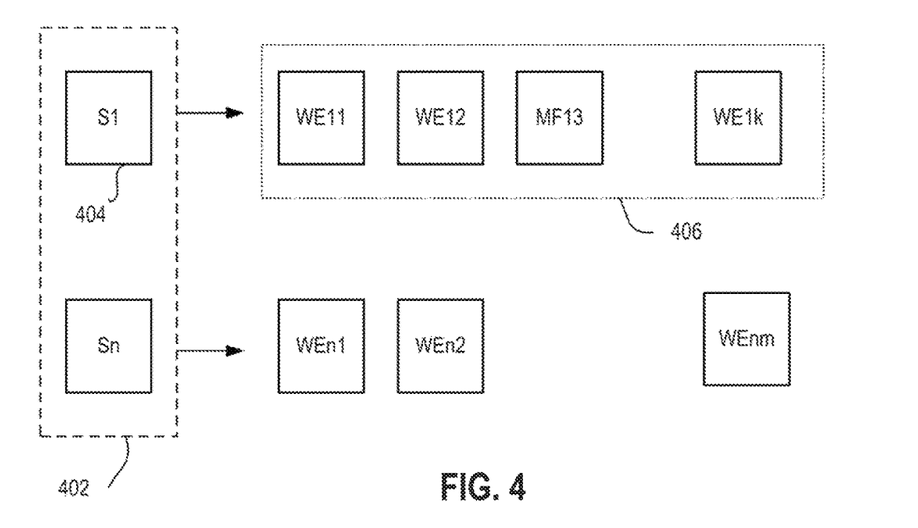
FIG. 4 is a block diagram depicting a stream matrix according to an embodiment.

FIG. 4 is a block diagram depicting a stream matrix 402 according to an embodiment. Stream matrix 402 includes pointers 404 to lists 406 of workstreams. In the example, pointers 404 to workstreams S1 and Sn are shown. Each list 406 includes the work-elements of the workstream. Optionally, a list 406 can include a pointer to a micro flow, which itself is represented by a stream matrix constructed similar to stream matrix 402.

Workflow Management

In this section, workflow automation and management algorithms executed by workflow manager 206 are described. The implementation of these algorithms relies heavily on graph theory and related algorithms. Workflows can be represented using Directed Acyclic Graphs (DAG), such as that shown in FIG. 3 described above. In an embodiment, the workflow management algorithm is divided in to 3 phases: the validation phase; the automatic workflow derivation phase; and the Scheduling phase. In the validation phase, the workflow definitions the user has provided are validated. The validation phase ensures that no cyclic workflow definitions exist that could lead to loops, no invalid platform requirements exist, and no invalid resource requirements exist. The automatic workflow derivation phase takes a validated workflow definition and derives workflows, micro flows, and derives the stream matrices needed by the workflow manager 206. Workflow manager 206 traverses the stream matrices and places work-elements referenced by the stream matrices in to a platform service pipelines for the cloud platforms. Workflow manager 206 also traverses the platform service pipelines and dispatches waiting work-elements in to appropriate platforms, subjected to resource availability. When a work-element is complete, it updates the corresponding stream matrix and schedules the next work-element in the stream matrix in to the pipeline.

Figure 5:
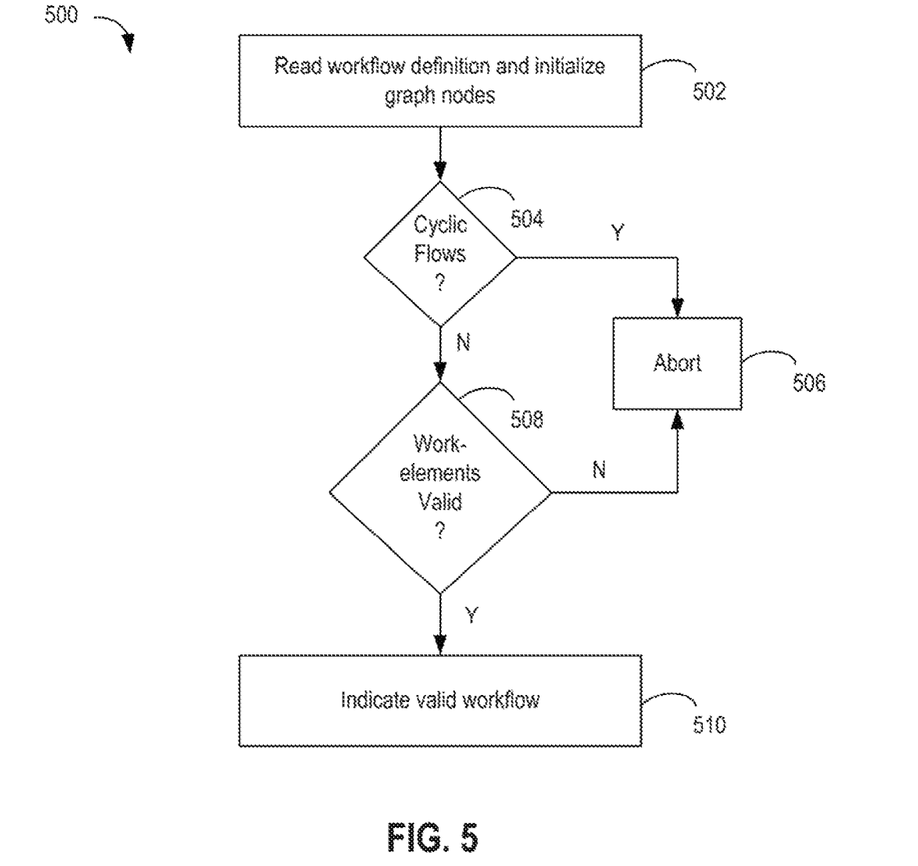
FIG. 5 is a flow diagram depicting a method of validating a workflow according to an embodiment.

FIG. 5 is a flow diagram depicting a method 500 of validating a workflow according to an embodiment. Method 500 begins at step 502, where workflow manager 206 reads a workflow definition specified by a user and initializes graph nodes of a workflow (e.g., as shown in the example of FIG. 3). At step 504, workflow manager 206 checks for existence of cyclic workflows in the workflow definition. If present, method 500 proceeds to step 506 and aborts. Otherwise, method 500 proceeds to step 508. At step 508, workflow manager 206 checks for validity of platforms and resource requirements specified in the workflow definition file. In general, workflow manager 206 checks to determine if the workflow-elements are valid. If invalid, method 500 proceeds to step 506 and aborts. Otherwise, method 500 proceeds to step 510 and indicates a valid workflow definition.

Figure 6:
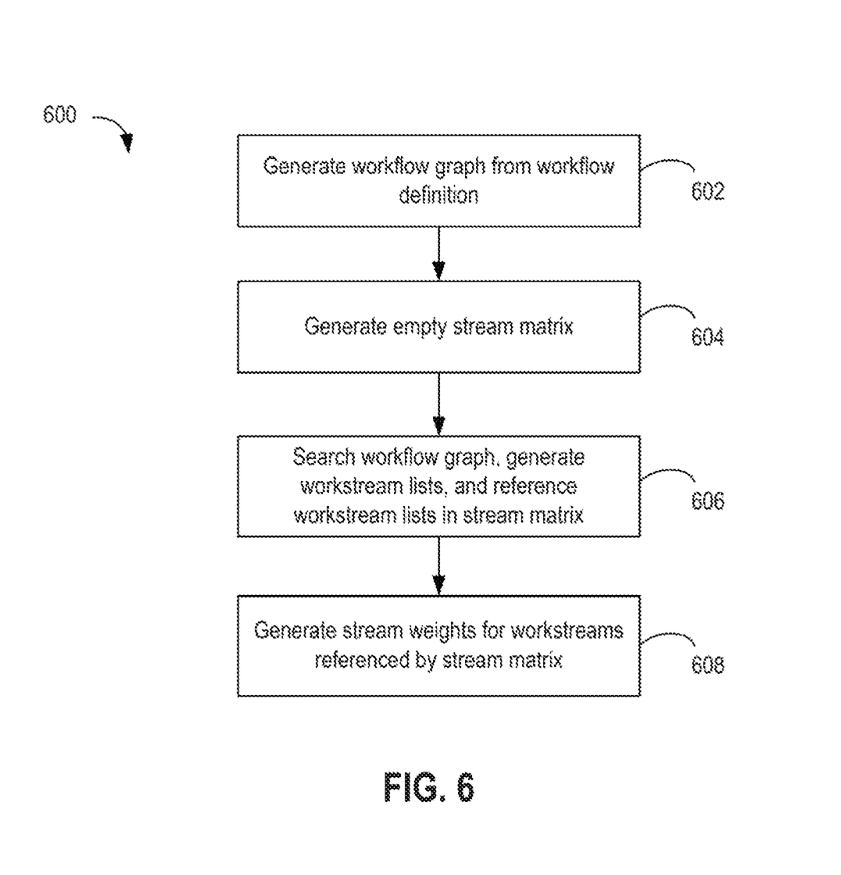
FIG. 6 is a flow diagram depicting a method of generating a workflow from a valid workflow definition according to an embodiment.

FIG. 6 is a flow diagram depicting a method 600 of generating a workflow from a valid workflow definition according to an embodiment. Method 600 begins at step 602, where workflow manager 206 builds a workstream graph of the workflow definitions (e.g., as shown in FIG. 3). In an embodiment, workflow manager 206 uses a topological sort to build the workstream graph. In some embodiments, workflow manager 206 can generate the workflow graph in the method 500 described above during validation and, as such, step 602 can be omitted. At step 604, workflow manager 206 creates an empty stream matrix. At step 606, workflow manager 206 initiates a breadth first search starting from the first node in the workflow graph. As the breadth first search traverses the workflow graph, workflow manager 206 places nodes (workflow-elements) into lists referenced by the stream matrix. If workflow manager 206 finds a work-element that has more than one next work-elements, then workflow manager 206 places a micro flow element (MF i,j) into the corresponding list and generates a new empty stream matrix to represent the micro flow. A new row is inserted, for each work-element in the next work-element list that has a different platform type than previously considered next work-elements of this node and cross-references the micro flow element (MF i,j) to the new stream matrix and vise-versa. Workflow generator 206 can execute method 600 for each micro flow found in the workflow. Pseudo-code for step 608 is as follows:

Generate a new empty stream matrix row for each next work-element whose platform type $PT_k \neq PT_m$, Where $PT_m$ represent set of Platform types up to the mth next work-element. $PT_k$ is the platform type of the kth next work-element. Here k=m+1

At step 608, workflow manager 206 generates stream weights for the workstreams referenced by the stream matrix. Corresponding stream weights are updated as follows: Stream weight is the sum of weights of all work-elements in a given workstream i. Stream Weight SW i=SUM W i,j for all j from 1 to n, where n is the number of work-elements in the stream, where SW i is the stream weight of the ith stream.

Figure 7:
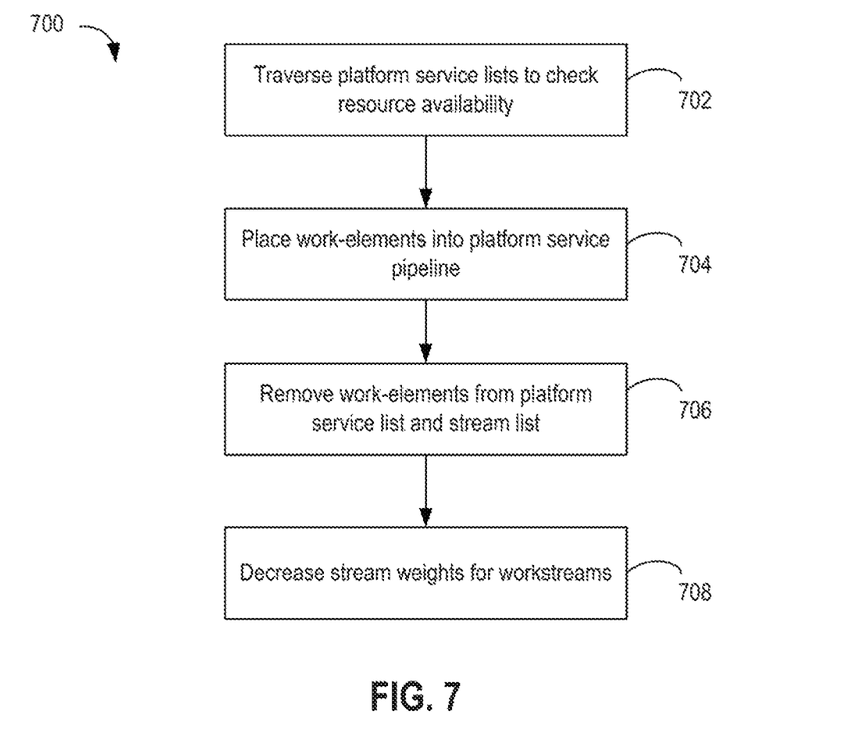
FIG. 7 is a flow diagram depicting a method of scheduling a workflow according to an embodiment.

FIG. 7 is a flow diagram depicting a method 700 of scheduling a workflow according to an embodiment. Workflow manager 206 services multiple workflows. As far as workflow manager 206 is concerned, workflows are presented in the format of a stream matrix. For simplicity and ease of explanation, a single stream matrix is considered. But the techniques apply equally to multiple workstreams, without loss of generality.

Method 700 begins at step 702, where workflow manager 206 traverses each platform service list in order and checks for the availability of resources. A given cloud platform can include a platform service list that describes available resources. If resources are not available, workflow generator 206 moves to the next work-element within the same linked list until it finds a work-element that can be serviced with the currently available resources or there are no further elements available in the platform service pipeline. At step 704, workflow manager 206 places work-elements into the platform service pipeline until the quota is met or all the work-elements in the service pipeline have been serviced. There is a scheduling quota for each platform service pipeline. The scheduling quota is the number of outstanding requests that can be pending on a given platform at any given time. Workflow manager 206 repeats this process across all the service pipelines. In an embodiment, a "fair service" algorithm is deployed across all platforms, which means the service quota is the same for all pipelines.

At step 706, when a work-element is complete, workflow manager 206 removes it from the platform service list. Workflow manager 206 also removes the work-element from the corresponding stream list. Workflow manager 206 marks the state as 'complete' and adds it back to the tail of the corresponding stream list. At step 708, workflow manager 206 decreases the corresponding stream weight W i, by Δ i. The idea here is that every time an work-element is serviced from a given workstream, the corresponding weight goes down. This allows for fairness and prevents a given stream from hijacking a platform.

Pseudo-code for method 700 is as follows:

```
for each list (row) in the stream matrix
    if(first element state == 'ready')
    then
        change it state to 'pending'
        if( the element type ==
            'work-element') then
            copy it to the
            corresponding platform queue.
            /* note we are not dequeuing the
             * element instead copying, so until
             * the work-element is done. Other
             * elements won't get Scheduled */
        else if ( the element type ==
                'micro-flow') then
            Load the corresponding stream
            matrix to scheduler
            /* Scheduler will pickup this in
             the next iteration */
        end if
    else if (first element state is !=
            'ready') then
        continue
        /* i.e. Go to next queue in stream
            matrix */
    end if
end for
if all head elements are in complete state then
    Job is done
else
    Wait and repeat the for loop.
end
```

Figure 8:
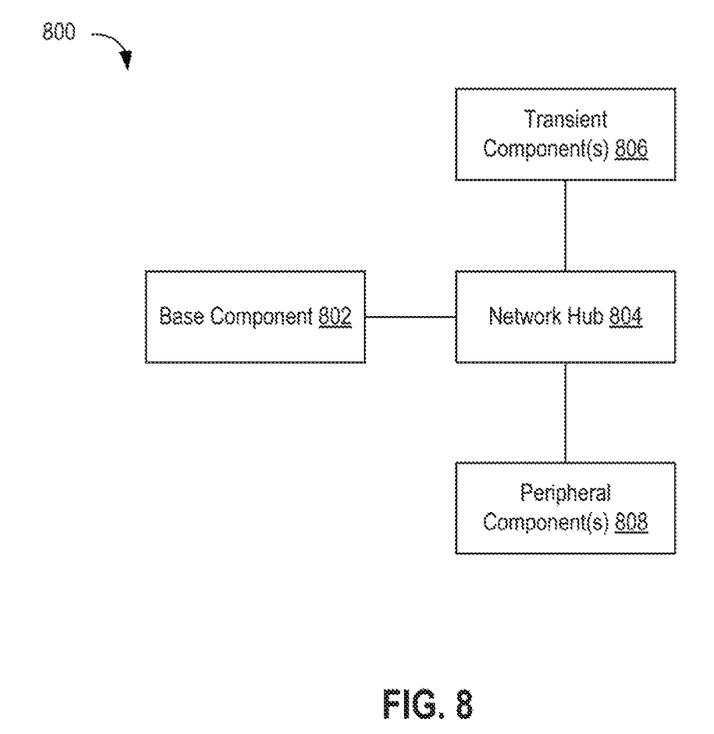
FIG. 8 is a block diagram depicting a virtual infrastructure architecture according to an embodiment.

FIG. 8 is a block diagram depicting a virtual infrastructure architecture 800 according to an embodiment. One goal of workflow management is to facilitate as many parallel executions of workstreams as possible to reduce the overall execution time and avoid unnecessary infrastructure changes that may slow down the overall execution time of the workflow. Architecture 800 includes a base component 802, a network hub 804, transient components 806, and peripheral network components 808. Base component 802 includes the topology elements that remain static throughout the entire workflow. Topology elements include, but not limited to, things such as storage elements, a test manager, a virtualization manager, a virtual network manager, and the like. Network hub 804 allows connection of different infrastructure components to form a cohesive infrastructure. Network hub 804 can be a logical network or an intranet connectivity device such as a VxLAN gateway or a combination of both. If the components are within the same cloud infrastructure, then network hub 804 is a logical network. If the components are placed within two different infrastructures, then network hub 804 can be an intranet connectivity device.

Transient components 806 are the components that appear on an as needed basis. Transient components 806 are connected to base component 802 via network hub 804 to form topology extensions. After the work-element is complete, these transient components 806 are deleted. At any given time, more than one transient component 806 can be part of the virtual topology. Workflow manager 206 expands and/or shrinks the virtual topology by adding and/or removing transient components as required by the workflow. Peripheral network components 808 include network address translation (NAT) services, edge routers, and the like that allow workflow components to reach networks outside the virtual topology. This includes the internet and intranet.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of workflow management in a cloud computing system, comprising:
   generating a workflow graph from a workflow definition, the workflow graph including nodes representing work-elements;
   generating a stream matrix from the workflow graph, the stream matrix including pointers to lists of the work-elements, each of the lists representing a workstream;
   processing the stream matrix to place work-elements in a platform service pipeline for the cloud computing system based on resource availability of the platform service pipeline; and
   removing work-elements from the lists and the platform service pipeline upon completion.

2. The method of claim 1, further comprising:
   reading the workflow definition; and
   verifying absence of cyclic workstreams in the workflow definition prior to generating the workflow graph.

3. The method of claim 2, further comprising:
   verifying validity of the work-elements prior to generating the workflow graph.

4. The method of claim 1, further comprising:
generating stream weights for each of the lists referenced by the stream matrix.

5. The method of claim 4, further comprising:
decreasing a stream weight of a list of the lists based on one or more work-elements removed from the list.

6. The method of claim 1, further comprising:
checking a platform service list for the cloud system to verify resource availability prior to processing the stream matrix.

7. The method of claim 1, wherein the workflow graph includes a workflow stream having a micro flow, the micro flow comprising a workflow having a plurality of workstreams, each workstream of the plurality of workstreams in the micro flow comprising a plurality of work-elements.

8. A non-transitory computer readable medium comprising instructions, which when executed in a computer system, causes the computer system to carry out a method of workflow management in a cloud computing system, comprising:
generating a workflow graph from a workflow definition, the workflow graph including nodes representing work-elements;
generating a stream matrix from the workflow graph, the stream matrix including pointers to lists of the work-elements, each of the lists representing a workstream;
processing the stream matrix to place work-elements in a platform service pipeline for the cloud computing system based on resource availability of the platform service pipeline; and
removing work-elements from the lists and the platform service pipeline upon completion.

9. The non-transitory computer readable medium of claim 8, further comprising:
reading the workflow definition; and
verifying absence of cyclic workstreams in the workflow definition prior to generating the workflow graph.

10. The non-transitory computer readable medium of claim 9, further comprising:
verifying validity of the work-elements prior to generating the workflow graph.

11. The non-transitory computer readable medium of claim 8, further comprising:
generating stream weights for each of the lists referenced by the stream matrix.

12. The non-transitory computer readable medium of claim 11, further comprising:
decreasing a stream weight of a list of the lists based on one or more work-elements removed from the list.

13. The non-transitory computer readable medium of claim 8, further comprising:
checking a platform service list for the cloud system to verify resource availability prior to processing the stream matrix.

14. The non-transitory computer readable medium of claim 8, wherein the workflow graph includes a workflow stream having a micro flow, the micro flow comprising a workflow having a plurality of workstreams, each workstream of the plurality of workstreams in the micro flow comprising a plurality of work-elements.

15. A computing system, comprising:
a plurality of cloud computing systems; and
a computer, coupled to the plurality of cloud computing systems, the computer executing a workflow manager configured to:
generate a workflow graph from a workflow definition, the workflow graph including nodes representing work-elements;
generate a stream matrix from the workflow graph, the stream matrix including pointers to lists of the work-elements, each of the lists representing a worktream;
process the stream matrix to place work-elements in a platform service pipeline for a cloud computing system based on resource availability of the platform service pipeline; and
remove work-elements from the lists and the platform service pipeline upon completion.

16. The computing system of claim 15, wherein the workflow manager is configured to:
read the workflow definition; and
verify absence of cyclic workstreams in the workflow definition prior to generating the workflow graph.

17. The computing system of claim 16, wherein the workflow manager is configured to:
verify validity of the work-elements prior to generating the workflow graph.

18. The computing system of claim 15, wherein the workflow manager is configured to:
generate stream weights for each of the lists referenced by the stream matrix.

19. The computing system of claim 18, wherein the workflow manager is configured to:
decrease a stream weight of a list of the lists based on one or more work-elements removed from the list.

20. The computing system of claim 15, wherein the workflow manager is configured to:
check a platform service list for the cloud system to verify resource availability prior to processing the stream matrix.

* * * * *